(12) United States Patent
Park et al.

(10) Patent No.: US 12,300,817 B2
(45) Date of Patent: May 13, 2025

(54) ANODE FOR LITHIUM SECONDARY BATTERY AND LITHIUM SECONDARY BATTERY INCLUDING THE SAME

(71) Applicant: SK ON CO., LTD., Seoul (KR)

(72) Inventors: So Hyun Park, Daejeon (KR); Chan Young Jeon, Daejeon (KR); Hee Gyoung Kang, Daejeon (KR); Hae Suk Hwang, Daejeon (KR)

(73) Assignee: SK ON CO., LTD., Seoul (KR)

( * ) Notice: Subject to any disclaimer, the term of this patent is extended or adjusted under 35 U.S.C. 154(b) by 501 days.

(21) Appl. No.: 17/708,888

(22) Filed: Mar. 30, 2022

(65) Prior Publication Data

US 2022/0328829 A1 Oct. 13, 2022

(30) Foreign Application Priority Data

Apr. 5, 2021 (KR) .......................... 10-2021-0043989

(51) Int. Cl.
| | |
|---|---|
| *H01M 4/583* | (2010.01) |
| *H01M 4/02* | (2006.01) |
| *H01M 4/04* | (2006.01) |
| *H01M 4/133* | (2010.01) |
| *H01M 4/36* | (2006.01) |
| *H01M 10/052* | (2010.01) |

(52) U.S. Cl.
CPC ......... *H01M 4/583* (2013.01); *H01M 4/0404* (2013.01); *H01M 4/133* (2013.01); *H01M 4/366* (2013.01); *H01M 10/052* (2013.01); *H01M 2004/021* (2013.01)

(58) Field of Classification Search
CPC .... H01M 4/583; H01M 4/0404; H01M 4/133; H01M 4/366; H01M 10/052; H01M 2004/021; H01M 4/364; H01M 4/587; H01M 2004/027; H01M 4/134; H01M 4/64; H01M 10/0525; H01M 4/625; Y02E 60/10

See application file for complete search history.

(56) References Cited

U.S. PATENT DOCUMENTS

| | | | |
|---|---|---|---|
| 2020/0235406 A1* | 7/2020 | Lee ........................ | H01M 4/583 |
| 2021/0167398 A1* | 6/2021 | Choi ..................... | H01M 4/366 |

FOREIGN PATENT DOCUMENTS

| | | |
|---|---|---|
| EP | 3793004 A1 | 3/2021 |
| KR | 10-2016-0093230 A | 8/2016 |
| KR | 10-2017-0051739 A | 5/2017 |
| KR | 10-2053843 B1 | 12/2019 |

(Continued)

OTHER PUBLICATIONS

Extended European Search Report for the European Patent Application No. 22165270.4 issued by the European Patent Office on Dec. 12, 2022.

*Primary Examiner* — Daniel S Gatewood
(74) *Attorney, Agent, or Firm* — IP & T GROUP LLP (57) ABSTRACT

An anode for a lithium secondary battery according to exemplary embodiments may include an anode current collector and an active material layer formed on at least one surface of the anode current collector and having a value of pore resistance to density within a predetermined range. Accordingly, it is possible to secure both high-capacity characteristics and high speed charging stability, thus to further improve capacity and efficiency of the lithium secondary battery.

13 Claims, 1 Drawing Sheet

(56) References Cited

FOREIGN PATENT DOCUMENTS

| | | |
|---|---|---|
| KR | 10-2020-0035885 A | 4/2020 |
| KR | 10-2020-0044703 A | 4/2020 |
| WO | WO-2020036392 A1 * | 2/2020 ........ H01M 10/0525 |

* cited by examiner

ANODE FOR LITHIUM SECONDARY BATTERY AND LITHIUM SECONDARY BATTERY INCLUDING THE SAME

CROSS-REFERENCE TO RELATED APPLICATION(S)

This application claims benefit of priority to Korean Patent Application No. 10-2021-0043989 filed on Apr. 5, 2021 in the Korean Intellectual Property Office, the disclosure of which is incorporated herein by reference in its entirety.

BACKGROUND OF THE INVENTION

1. Field of the Invention

The present invention relates to an anode for a lithium secondary battery and a lithium secondary battery including the same.

2. Description of the Related Art

A secondary battery is a battery which can be repeatedly charged and discharged. With rapid progress of information and communication, and display industries, the secondary battery has been widely applied to various portable telecommunication electronic devices such as a camcorder, a mobile phone, a laptop computer as a power source thereof. Recently, a battery pack including the secondary battery has also been developed and applied to an eco-friendly automobile such as a hybrid vehicle as a power source thereof.

Examples of the secondary battery may include a lithium secondary battery, a nickel-cadmium battery, a nickel-hydrogen battery and the like. Among them, the lithium secondary battery has a high operating voltage and a high energy density per unit weight, and is advantageous in terms of a charging speed and light weight, such that development thereof has been proceeded in this regard.

The lithium secondary battery may include: an electrode assembly including a cathode, an anode, and a separation membrane (separator); and an electrolyte in which the electrode assembly is impregnated. In addition, the lithium secondary battery may further include, for example, a pouch-shaped outer case in which the electrode assembly and the electrolyte are housed.

For example, the lithium secondary battery may include an anode made of a carbon material etc. capable of intercalating and deintercalating lithium ions, a cathode made of a lithium-containing oxide, etc., and a non-aqueous electrolyte in which an appropriate amount of lithium salt is dissolved in a mixed organic solvent.

In order to increase an energy density of the lithium secondary battery, a method for increasing a density of an anode electrode slurry have been studied.

For example, Korean Patent Registration No. 10-2053843 discloses an anode active material including a spherical carbon-based material applied thereto in order to implement a high energy density. However, when only increasing the density of the electrode slurry, a pore structure in the electrode becomes complicated. Thereby, the number of pores through which lithium can move is decreased, and initial charge/discharge efficiency, high rate characteristics, and life-span characteristics of the lithium secondary battery may be reduced.

PRIOR ART DOCUMENT

Patent Document

Korean Patent Registration No. 10-2053843

SUMMARY OF THE INVENTION

One object of the present invention is to provide an anode for a lithium secondary battery having improved life-span characteristics and electrical characteristics.

Another object of the present invention is to provide a lithium secondary battery including the anode having improved life-span characteristics and electrical characteristics.

To achieve the above objects, according to an aspect of the present invention, there is provided an anode for a lithium secondary battery including: an anode current collector; and an anode active material layer which is formed on at least one surface of the anode current collector and satisfies Equation 1 below:

$$7.99 \leq R^f_{ion}/D^f_{vd} \leq 19.21 \qquad \text{[Equation 1]}$$

(In Equation 1, $R^f_{ion}$ is a pore resistance ($\Omega$) after formation, and $D^f_{vd}$ is a density (g/cc) of the anode active material layer after formation).

In some embodiments, the anode active material layer may have a value of pore resistance ($R^f_{ion}$) to density ($D^f_{vd}$) after formation in a range of $12.34 \leq R^f_{ion}/D^f_{vd} \leq 17.93$ in Equation 1 above.

In some embodiments, $R^f_{ion}$ may be 12.15 to 26.42$\Omega$.

In some embodiments, $D^f_{vd}$ may be 1.36 to 1.52 g/cc.

In some embodiments, the anode active material layer may satisfy Equation 2 below:

$$4.97 \leq R^0_{ion}/D^0_{vd} \leq 14.00 \qquad \text{[Equation 2]}$$

In Equation 2, $R^0_{ion}$ is a pore resistance ($\Omega$) before formation, and $D^0_{vd}$ is a density of the anode active material layer after vacuum drying and before formation (g/cc).

In some embodiments, the anode active material layer may have a value of pore resistance ($R^0_{ion}$) to density ($D^0_{vd}$) before formation in a range of $8.87 \leq R^0_{ion}/D^0_{vd} \leq 13.05$ in Equation 2 above.

In some embodiments, $R^0_{ion}$ may be 8.3 to 21.0$\Omega$.

In some embodiments $R^0_{vd}$ may be 1.50 to 1.67 g/cc.

In some embodiments, a loading amount per unit area of the anode current collector of the anode active material layer may be 7.0 to 13.0 mg/cm². At this time, the loading amount per unit area may refer to an energy density per unit area of the active material layer of the anode, and may be calculated using a weight and area of the electrode, a capacity of the active material, and a ratio of the active material included in the active material layer.

In some embodiments, the anode active material layer may include artificial graphite as an anode active material.

In some embodiments, the artificial graphite may be included in an amount of 70% or more based on a total weight of the anode active material.

In some embodiments, the anode active material may include first artificial graphite in a form of secondary particles and second artificial graphite in a form of single particles;

In some embodiments, an amount of the first artificial graphite may be larger than an amount of the second artificial graphite.

In some embodiments, the first artificial graphite may be included in an amount of 30 to 70% by weight and the second artificial graphite is included in an amount of 30 to 70% by weight based on the total weight of the anode active material.

In some embodiments, the first artificial graphite may include core particles and an amorphous coating formed on the core particles.

In some embodiments, the second artificial graphite may include core particles and an amorphous coating formed on the core particles.

In some embodiments, the first artificial graphite particles may have an average particle diameter larger than an average particle diameter of the second artificial graphite particles.

According to another aspect of the present invention, there is provided a lithium secondary battery including: the anode for a lithium secondary battery of the above-described embodiments; and a cathode which is disposed to face the anode with being physically separated therefrom.

The anode for a lithium secondary battery according to exemplary embodiments may include an anode current collector and an active material layer formed on at least one surface of the anode current collector and having a value of pore resistance to density within a predetermined range. Accordingly, it is possible to secure both high-capacity characteristics and stability during high speed charging, thus to further improve capacity and efficiency of the lithium secondary battery.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Exemplary embodiments of the present invention provide an anode for a lithium secondary battery which includes an anode current collector, and an anode active material layer formed on at least one surface of the anode current collector and having a value of pore resistance to density within a predetermined range, thereby having improved electrical properties.

Hereinafter, exemplary embodiments of the present invention will be described in detail with reference to the accompanying drawings. However, these embodiments are merely an example, and the present invention is not limited to the specific embodiments described as the example.

Figure 1:
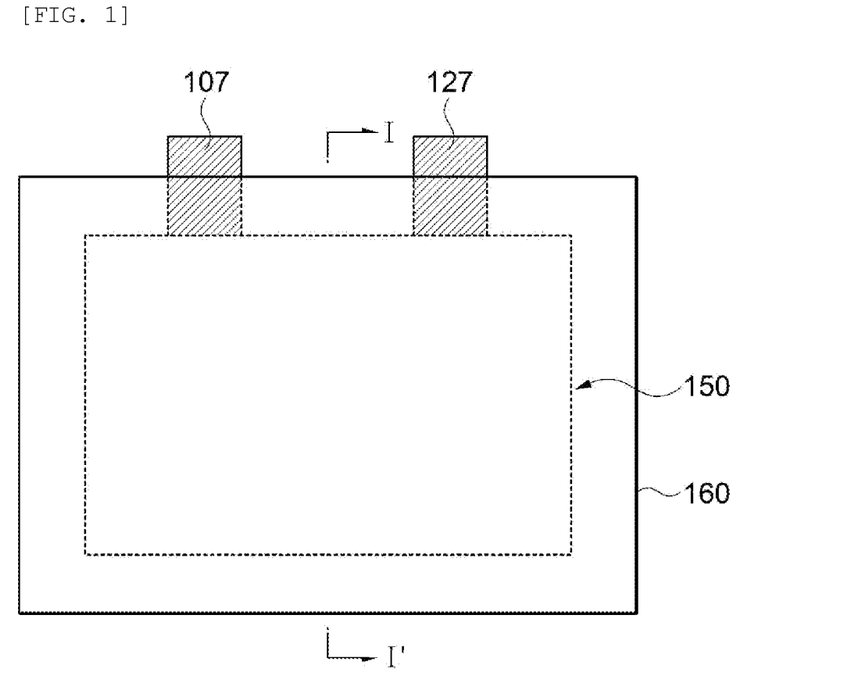
FIG. 1 is a schematic plan view illustrating a lithium secondary battery according to exemplary embodiments.
Figure 2:
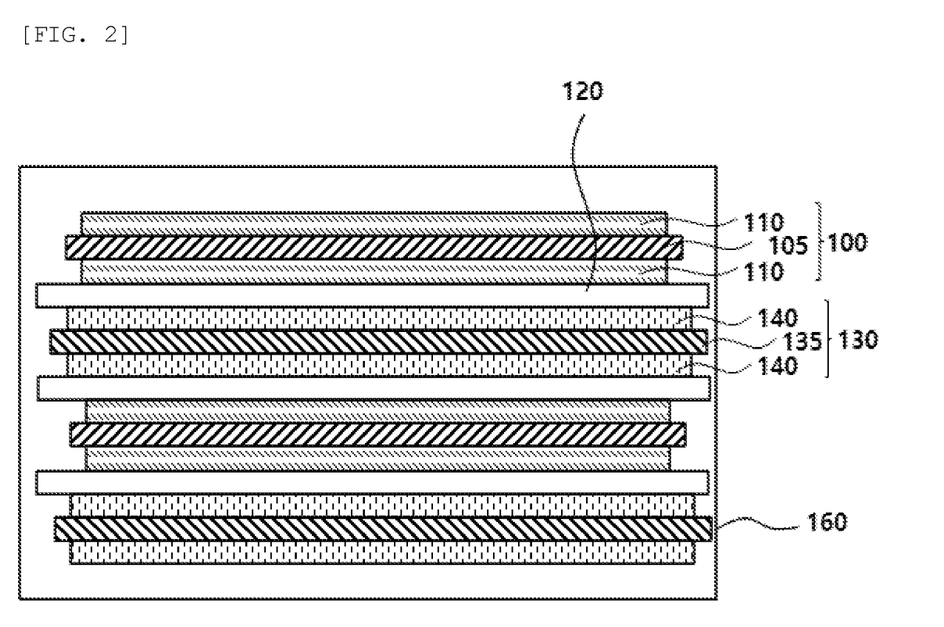
FIG. 2 is a schematic cross-sectional view illustrating a lithium secondary battery according to exemplary embodiments.

FIGS. 1 and 2 are a schematic plan view and a cross-sectional view of a lithium secondary battery according to exemplary embodiments, respectively. For example, FIG. 2 is a cross-sectional view taken on line I-I' shown in FIG. 1 in a thickness direction of the lithium secondary battery.

In FIGS. 1 and 2, two directions perpendicular to each other on a plane are defined as a first direction and a second direction. For example, the first direction may be a longitudinal direction of the lithium secondary battery, and the second direction may be a width direction of the lithium secondary battery.

Meanwhile, for the convenience of description, a cathode and an anode are not illustrated in FIG. 1.

Referring to FIGS. 1 and 2, the lithium secondary battery may include an electrode assembly 150 and a case 160 in which the electrode assembly 150 is housed. The electrode assembly 150 may include a cathode 100, an anode 130 and a separation membrane 120.

The cathode 100 may include a cathode current collector 105 and a cathode active material layer 110 formed on at least one surface of the cathode current collector 105. In exemplary embodiments, the cathode active material layer 110 may be formed on both surfaces (e.g., upper and lower surfaces) of the cathode current collector 105. For example, the cathode active material layer 110 may be coated on the upper and lower surfaces of the cathode current collector 105, respectively, and may be directly coated on the surface of the cathode current collector 105.

The cathode current collector 105 may include, for example, stainless steel, nickel, aluminum, titanium, copper or an alloy thereof, and preferably aluminum or an aluminum alloy.

The cathode active material layer 110 includes lithium metal oxide as a cathode active material, and according to exemplary embodiments, may include lithium (Li)-nickel (Ni)-based oxide.

In some embodiments, the lithium metal oxide included in the cathode active material layer 110 may be represented by Formula 1 below.

[Formula 1]

$$Li_{1+\alpha}Ni_{1-(x+y)}Co_xM_yO_2$$

In Formula 1, α, x and y may be in a range of $-0.05 \leq \alpha \leq 0.15$, $0.01 \leq x \leq 0.2$, and $0 \leq y \leq 0.2$, respectively, and M may be at least one element selected from the group consisting of Mg, Sr, Ba, B, Al, Si, Mn, Ti, Zr and W. In one embodiment, x and y may be in a range of $0.01 \leq x \leq 0.20$, and $0.01 \leq y \leq 0.15$, respectively.

Preferably, in Formula 1, M may be manganese (Mn). In this case, nickel-cobalt-manganese (NCM)-based lithium oxide may be used as the cathode active material.

For example, nickel may be provided as metal associated with capacity of the lithium secondary battery. The higher the content of nickel, the better the capacity and output of the lithium secondary battery. However, if the content of nickel is excessively increased, the life-span of the lithium secondary battery may be reduced, and it may be disadvantageous in terms of mechanical and electrical stabilities. For example, cobalt (Co) may be metal associated with conductivity or resistance of the lithium secondary battery. In one embodiment, M includes manganese (Mn), and Mn may be provided as metal associated with mechanical and electrical stability of the lithium secondary battery.

Through the above-described interaction between nickel, cobalt and manganese, capacity, output, low resistance, and life-span stability from the cathode active material layer 110 may be improved together.

A slurry may be prepared by mixing the cathode active material with a binder, a conductive material and/or a dispersant in a solvent, followed by stirring the same. The slurry may be coated on the cathode current collector 105, followed by compressing and drying to manufacture the cathode active material layers 110.

The binder may include, for example, an organic binder such as vinylidene fluoride-hexafluoropropylene copolymer (PVDF-co-HFP), polyvinylidene fluoride (PVDF), polyacrylonitrile, polymethyl methacrylate, etc., or an aqueous binder such as styrene-butadiene rubber (SBR), and may be used together with a thickener such as carboxymethyl cellulose (CMC).

For example, a PVDF-based binder may be used as a cathode forming binder. In this case, an amount of the binder for forming the cathode active material layer 110 may be reduced and an amount of the cathode active material or lithium metal oxide particles may be relatively increased, thereby improving the output and capacity of the secondary battery.

The conductive material may be included to facilitate electron transfer between the active material particles. For example, the conductive material may include a carbon-based conductive material such as graphite, carbon black, graphene, or carbon nanotubes and/or a metal-based conductive material such as tin, tin oxide, titanium oxide, or a perovskite material such as $LaSrCoO_3$, and $LaSrMnO_3$.

In some embodiments, an electrode density of the cathode 100 may be 3.0 to 3.9 g/cc, and preferably 3.2 to 3.8 g/cc.

In some embodiments, the cathode active material layer 110 may have a multilayer structure.

The anode 130 may include an anode current collector 135 and an anode active material layer 140 formed on at least one surface of the anode current collector 135. According to exemplary embodiments, the anode active material layer 140 may be formed on both surfaces (e.g., upper and lower surfaces) of the anode current collector 135. The anode active material layer 140 may be coated on the upper and lower surfaces of the anode current collector 135, respectively. For example, the anode active material layer 140 may directly contact with the surface of the anode current collector 135.

The anode current collector 135 may include gold, stainless steel, nickel, aluminum, titanium, copper or an alloy thereof, and preferably copper or a copper alloy.

According to exemplary embodiments, the anode active material layer 140 may include an anode active material. The anode active material may include a material capable of intercalating/deintercalating lithium ions.

In exemplary embodiments, the anode active material layer may satisfy Equation 1 below.

$$7.99 \leq R^{f}_{ion}/D^{f}_{vd} \leq 19.21 \quad \text{[Equation 1]}$$

In Equation 1, $R^{f}_{ion}$ and $D^{f}_{vd}$ may be values after formation, wherein $R^{f}_{ion}$ may be a pore resistance (Ω), and $D^{f}_{vd}$ may be a density (g/cc) of the anode active material layer.

The formation is a process of stabilizing a battery structure and allowing the anode for a lithium secondary battery to be in a usable state. For example, the formation process may include a pre-charging process, a degassing process, a full charging/discharging process, an aging process, a charging process and the like.

The pre-charging process may induce a side reaction gas to reduce the unfilled region, and thereby substantially increasing a reversible capacity. The pre-charging process may be performed in a manner of charging the state of charge (SOC) to 20%, followed by resting. The full charging/discharging process is a process for forming a film such as a solid electrolyte interphase (SEI) layer on the surface of the anode. The degassing process is a process of removing gas generated due to a side reaction, which may prevent swelling of the electrode. The aging process is a process of impregnating an electrolyte into the anode for a lithium secondary battery. The charging process is a process for charging the product before shipment after performing the full charging/discharging process.

The pore resistance ($R_{ion}$) refers to a resistance taken to propagate the electrolyte into the anode. The higher the pore resistance, the higher the resistance that interrupts lithium ions of the electrolyte from reaching to the current collector from the anode surface, such that input/output performance of the battery may be reduced.

The pore resistance $R_{ion}$ may be obtained using electrochemical impedance spectroscopy (EIS).

Impedance measurement data for each frequency measured by the impedance spectroscopy may be obtained through an impedance equation represented by Mathematical equations 1 and 2 below.

[Mathematical equation 1]

$$Z_{faradaic} = \sqrt{\frac{R_{ion,L} \cdot R_{ct,A}}{(1+j\omega R_{ct,A} \cdot C_{dL,A}) \cdot 2\pi r}} \coth \sqrt{\frac{R_{ion,L} \cdot (1+j\omega R_{ct,A} \cdot C_{dLA}) \cdot 2\pi r}{R_{ct,A}}} L$$

Mathematical equation 1 uses the transmission line model (TLM) theory, and is an equation derived from the impedance theory for cylindrical pores, which is a theory of resistance based on assuming that all the pores are cylindrical in shape.

Since j part in Mathematical equation 1 above is an imaginary number, if removing the j part by setting the ω value to be zero (0), Mathematical equation 2 below may be obtained.

$$Z'_{faradaic,\omega \to 0} = \frac{R_{ion}}{3} = R_{ct} \quad \text{[Mathematical equation 2]}$$

In Mathematical equation 2, $Z'_{faradaic,\omega \to o}$ is a total resistance value, $R_{ion}$ is a pore resistance value, and $R_{ct}$ is a charge transfer resistance value.

When using a coin cell manufactured of a symmetrical cell to which the anodes are equally applied as a working electrode and a counter electrode, electron transfer does not occur and the $R_{ct}$ value is 0. Therefore, a three-fold value of $Z'_{faradaic,\omega \to o}$, which is the resistance value, may be derived as the pore resistance ($R_{ion}$) value.

The pore resistance may vary depending on intrinsic properties of the active material itself, but may also vary depending on the density of the active material layer. The smaller the pore resistance, the better the diffusion rate of lithium ions, and improved electrochemical properties may be exhibited.

In some embodiments, the $R^{f}_{ion}$ may be 12.50 to 26.42Ω. When the $R^{f}_{ion}$ exceeds 26.42Ω, pores through which lithium ions can move are not well formed in the anode active material layer, such that high-rate charge/discharge characteristics of the lithium secondary battery are remarkably reduced, and when it is less than 12.50Ω, long-life stability may be reduced.

The density ($D^{f}_{vd}$) is the density of the anode active material layer formed on the anode current collector, and may refer to a density measured based on a volume including voids formed between the active material particles. The density may be derived by measuring a thickness of the anode active material layer.

In some embodiments, the $D^{f}_{vd}$ may be 1.36 to 1.52 g/cc. When the $D^{f}_{vd}$ exceeds 1.52 g/cc, cracks may occur in the anode active material, thereby causing a reduction in the stability of the electrode, and when the $D^f_{vd}$ is less than 1.36 g/cc, it is not possible to implement a battery having a target capacity.

A value of pore resistance ($R^f_{ion}$) to density ($D^f_{vd}$) (i.e., $R^f_{ion}/D^f_{vd}$) after formation in Equation 1 is designed in consideration of the correlation between the pore resistance and the density which affect output characteristics and capacity characteristics in the anode actually manufactured. Thereby, it is possible to predict life-span characteristics and electrical characteristics of the anode for a lithium secondary battery.

When the $R^f_{ion}/D^f_{vd}$ value exceeds 19.21 or is less than 7.99, a capacity retention rate and high speed charging performance of the lithium secondary battery may be decreased.

In some embodiments, in Equation 1, the value of pore resistance ($R^f_{ion}$) to density ($D^f_{vd}$) may be $12.34 \leq R^f_{ion}/D^f_{vd} \leq 17.93$.

When the anode active material layer is formed in the range defined in Equation 1 above, an anode having high capacity characteristics and stability during high speed charging may be further easily provided, and the capacity and efficiency of a lithium secondary battery including the same may be further improved.

In exemplary embodiments, the anode active material layer may satisfy Equation 2 below.

$$4.97 \leq R^0_{ion}/D^0_{vd} \leq 14.00 \qquad \text{[Equation 2]}$$

In Equation 2, $R^0_{ion}$ and $D^0_{vd}$ may be values before formation, wherein $R^0_{ion}$ may be a pore resistance (Ω), and $D^0_{vd}$ may be a density after vacuum drying (g/cc).

In some embodiments, the $R^0_{ion}$ may be 8.3 to 21.0Ω, and preferably, 14.0 to 21.0Ω. When the $R^0_{ion}$ exceeds 21.0Ω, pores through which lithium ions can move are not well formed in the anode active material layer, such that the high-rate charge/discharge characteristic of the lithium secondary battery is significantly reduced, and when it is less than 8.3Ω), long-life stability may be reduced.

The density ($D^0_{vd}$) is the density after vacuum drying of the anode active material layer formed on the anode current collector, and may refer to a density measured based on the volume including the voids formed between the active material particles. The density may be derived by measuring the thickness of the anode active material layer. The vacuum drying may be performed at a temperature higher than room temperature at a pressure lower than atmospheric pressure so that a liquid such as a solvent does not remain in the anode active material layer. For example, the vacuum drying may be performed at a temperature of 120° C. at 5 Torr for 12 hours.

In some embodiments, the $D^0_{vd}$ may be 1.5 to 1.8 g/cc, preferably 1.58 to 1.63 g/cc. If the $D^0_{vd}$ exceeds 1.8 g/cc, cracks may occur in the anode active material, thereby causing a reduction in the stability of the electrode, and when the $D^0_{vd}$ is less than 1.5 g/cc, it is not possible to implement a battery having a target capacity.

A value of pore resistance ($R^0_{ion}$) to density ($D^0_{vd}$) (i.e., $R^0_{ion}/D^0_{vd}$) before formation in Equation 2 is designed in consideration of the correlation between the pore resistance and the density which affect output characteristics and capacity characteristics in the anode actually manufactured. Thereby, it is possible to predict life-span characteristics and electrical characteristics of the anode for a lithium secondary battery.

When the $R^0_{ion}/D^0_{vd}$ value exceeds 14.00 or is less than 4.97, the capacity retention rate and high speed charging performance of the lithium secondary battery may be decreased. Preferably, in Equation 2, the value of pore resistance ($R^1_{ion}$) to density ($D^1_{vd}$) may be $8.87 \leq R^1_{ion}/D^1_{vd} \leq 13.05$.

When the anode active material layer is formed in the range defined in Equation 2 above, an anode having high capacity characteristics and stability during high speed charging may be further easily provided, and the capacity and efficiency of a lithium secondary battery including the same may be further improved.

In exemplary embodiments, the anode active material may be included in an amount of 80 to 99% by weight ('wt. %) based on a total weight of the anode active material layer 140. Preferably, the anode active material is included in an amount of 90 to 98 wt. % based on the total weight of the anode active material layer 140.

In some embodiments, the anode active material may include a carbon-based material. Examples of the carbon-based active material may include artificial graphite, natural graphite, carbon nanotubes, carbon fibers, carbon black and the like. Preferably, the carbon-based active material includes artificial graphite and/or natural graphite.

In some embodiments, the carbon-based material may include 70% or more of artificial graphite. When including the artificial graphite in an amount of less than 70%, the range of Equation 1 may not be satisfied.

In some embodiments, a slurry may be prepared by mixing the anode active material with a binder, a conductive material and/or a dispersant in a solvent. The anode slurry may be applied to (coated on) the anode current collector 135, followed by compressing (rolling) and drying to prepare the anode active material layer 140.

In some embodiments, a loading amount of the anode active material layer may be 7.0 to 13.0 mg/cm², and preferably 7.0 to 12.8 mg/cm². When satisfying the loading amount of 7.0 to 13.0 mg/cm² while satisfying the range of Equation 1 at the same time, the high capacity characteristics and stability of the anode during high speed charging may be improved together. The loading amount may be adjusted according to the weight of the anode slurry including the anode active material, the conductive material and the binder.

In some embodiments, the anode active material includes first artificial graphite in a form of secondary particles and second artificial graphite in a form of single particles.

In some embodiments, the first artificial graphite is included in an amount of 30 to 70% by weight and the second artificial graphite is included in an amount of 30 to 70% by weight based on the total weight of the anode active material.

Herein, the first artificial graphite includes core particles and an amorphous coating formed on the core particles, and the second artificial graphite includes core particles and an amorphous coating formed on the core particles.

In some embodiments, the first artificial graphite particles have an average particle diameter larger than an average particle diameter of the second artificial graphite.

Materials substantially the same as or similar to those used for forming the cathode 100 may be used as the binder and the conductive material for forming the anode. In some embodiments, the binder for forming the anode 130 may include, for example, an aqueous binder such as styrene-butadiene rubber (SBR) for consistency with the carbon-based active material, and may be used together with a thickener such as carboxymethyl cellulose (CMC).

In some embodiments, the anode 130 may have an area (e.g., a contact area with the separation membrane 120) and/or volume larger than those/that of the cathode 100.

Thereby, lithium ions generated from the cathode 100 may smoothly move to the anode 130 without being precipitated in the middle, for example. Therefore, output and capacity characteristics may be further improved.

According to exemplary embodiments, the anode active material layer 140 may have a multilayer structure.

The separation membrane 120 may be interposed between the cathode 100 and the anode 130. The separation membrane 120 may include a porous polymer film made of a polyolefin polymer such as ethylene homopolymer, propylene homopolymer, ethylene/butene copolymer, ethylene/hexene copolymer, ethylene/methacrylate copolymer. The separation membrane 120 may include a nonwoven fabric made of glass fiber having a high melting point, polyethylene terephthalate fiber or the like.

The separation membrane 120 may extend in the second direction between the cathode 100 and the anode 130, and may be folded and wound in a thickness direction of the lithium secondary battery. Thereby, a plurality of cathodes 100 and anodes 130 may be laminated in the thickness direction through the separation membrane 120.

According to exemplary embodiments, an electrode cell is defined by the cathode 100, the anode 130 and the separation membrane 120, and a plurality of the electrode cells are stacked to form a jelly roll type electrode assembly 150, for example. For example, the electrode assembly 150 may be formed by winding, lamination, folding, or the like of the separation membrane 120.

The electrode assembly 150 is housed in the case 160, and an electrolyte may be injected into the case 160 together. The case 160 may include, for example, a pouch, a can, or the like in shape.

According to exemplary embodiments, a non-aqueous electrolyte may be used as the electrolyte.

The non-aqueous electrolyte includes a lithium salt of an electrolyte and an organic solvent, and the lithium salt is represented by, for example, $Li^+X^-$, and $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $(CF_3CF_2SO_3)^-$, $(CF_3SO_2)_2N^-$, $FSO_2)_2N^-$, $CF_3CF_2(CF_3)_2CO^-$, $(CF_3SO_2)_2CH^-$, $(SF_5)_3C$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$, etc. may be exemplified.

As the organic solvent, for example, propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxyethane, diethoxyethane, vinylene carbonate, sulforane, γ-butyrolactone, propylene sulfite, tetrahydrofurane, and the like may be used. These compounds may be used alone or in combination of two or more thereof.

As shown in FIG. 1, electrode tabs (a cathode tab and an anode tab) may protrude from the cathode current collector 105 and the anode current collector 135, respectively, which belong to each electrode cell, and may extend to one side of the case 160. The electrode tabs may be fused together with the one side of the case 160 to form electrode leads (a cathode lead 107 and an anode lead 127) extending or exposed to an outside of the case 160.

FIG. 1 illustrates that the first electrode lead 107 and the second electrode lead 137 are formed on the same side of the lithium secondary battery or the case 160, but these electrode leads may be formed on sides opposite to each other.

For example, the first electrode lead 107 may be formed on one end of the case 160, and the second electrode lead 137 may be formed on the other end of the case 160.

The lithium secondary battery may be manufactured, for example, in a cylindrical shape using a can, a square shape, a pouch type or a coin shape.

In some embodiments, the lithium secondary battery may have a capacity retention rate of 80% or more when charging at a C-rate of 1.8 to 2.2.

Hereinafter, specific experimental examples are proposed to facilitate understanding of the present invention. However, the following examples are only given for illustrating the present invention and those skilled in the art will obviously understand that various alterations and modifications are possible within the scope and spirit of the present invention. Such alterations and modifications are duly included in the appended claims.

Examples and Comparative Examples (1) Preparation of Anode Active Material

1) Preparation of Artificial Graphite Single Particles

Cokes were pulverized, then powder was subjected to heat treatment at 3000° C. for 20 hours to prepare artificial graphite single particles having an average particle diameter ($D_{50}$) of 7.5 μm.

2) Preparation of Artificial Graphite Secondary Particles

Cokes were pulverized, then powder was subjected to heat treatment at 3000° C. for 20 hours to prepare artificial graphite single particles having an average particle diameter (D50) of 7.5 μm. The artificial graphite single particles and pitch are mixed in a weight ratio of 90:10, then the mixture was subjected to heat treatment at 600° C. for 3 to 5 hours to prepare secondary particles in which the single particles were aggregated. The secondary particles had an average particle diameter ($D_{50}$) of 16 μm. Thereafter, the powder was subjected to heat treatment at 3000° C. to prepare artificial graphite secondary particles.

3) Preparation of Natural Graphite Particles

After spherical-shaped natural graphite was obtained by putting flaky graphite in a continuous crushing classifier, acid treatment was performed at 80° C. for 12 hr using sulfuric acid/hydrochloric acid/nitric acid, and spherical natural graphite having a final purity of 99.8% was obtained through washing with water and drying. The obtained spherical natural graphite had a $D_{50}$ of 10 μm, and an average specific surface area of 10 m²/g.

The spherical natural graphite and pitch were mixed in a weight ratio of 95:5, then coating was performed thereon using a blade mill for 30 min, and calcination was performed using roller hearth kiln (RHK) under a nitrogen atmosphere at 1200° C. for 12 hr. Then, natural graphite particles were obtained through classification and de-ironization processes.

(2) Preparation of Anode

A slurry was prepared by mixing the anode active material and a binder in amounts as shown in Table 1 below. A copper (Cu) foil was coated with the anode active material and cut to size through a notching process after rolling. Thereafter, vacuum drying was performed thereon at 120° C. and 5 Torr for 12 hours to prepare an anode.

TABLE 1

| | Anode active material | | | | |
| | Artificial graphite | | | | |
| | Secondary particle form (wt. %) | Single particle form (wt. %) | Natural graphite (wt. %) | Binder (wt. %) | Conductive material (wt. %) | Loading amount (mg/cm$^2$) |
|---|---|---|---|---|---|---|
| Example 1 | 28.3 | 66.0 | — | 2.7 | 3.0 | 11.0 |
| Example 2 | 28.3 | 66.0 | — | 2.7 | 3.0 | 11.0 |
| Example 3 | 66.0 | 28.3 | — | 2.7 | 3.0 | 11.0 |
| Example 4 | 66.0 | 28.3 | — | 2.7 | 3.0 | 12.8 |
| Example 5 | 28.3 | 66.0 | — | 2.7 | 3.0 | 12.8 |
| Example 6 | 60.0 | 34.3 | — | 2.7 | 3.0 | 12.8 |
| Example 7 | 34.3 | 60.0 | — | 2.7 | 3.0 | 7.0 |
| Comparative Example 1 | — | 66.0 | 28.3 | 2.7 | 3.0 | 12.8 |
| Comparative Example 2 | 94.3 | — | — | 2.7 | 3.0 | 12.8 |
| Comparative Example 3 | 19.8 | 8.5 | 66.0 | 2.7 | 3.0 | 12.8 |
| Comparative Example 4 | 46.2 | 19.8 | 28.3 | 2.7 | 3.0 | 12.8 |
| Comparative Example 5 | 46.2 | 19.8 | 28.3 | 2.7 | 3.0 | 12.8 |
| Comparative Example 6 | 46.2 | 19.8 | 28.3 | 2.7 | 3.0 | 12.8 |
| Comparative Example 7 | 60.0 | 34.3 | — | 2.7 | 3.0 | 6.8 |

(3) Preparation of Cathode $LiNi_{0.8}Co_{0.1}Mn_{0.1}O_2$ as a cathode active material, carbon black as a conductive material, and polyvinylidene fluoride (PVDF) as a binder were mixed in a mass ratio of 92:5:3 to prepare a cathode slurry, then the slurry was coated on an aluminum substrate, followed by drying and pressing to form a cathode plate.

(4) Preparation of Secondary Battery

The cathode and anode prepared above were disposed with a polyethylene (PE) separation membrane (thickness: 13 μm) interposed therebetween to form an electrode cell, and a jelly roll was made to manufacture a 20 Ah-class large cell.

Experimental Example (1) Measurement of Pore Resistance and Density
1) Measurement of Pore Resistance Pore resistances ($R^0_{ion}$) before formation using a symmetric coin cell to which the anodes of Examples 1 to 7 and Comparative Examples 1 to 7 prepared above are equally applied as a working electrode and a counter electrode were measured through electrochemical impedance spectroscopy (EIS).

The manufactured symmetric coin cell was irradiated with light in a frequency range from 500 KHz to 100 mHz to perform impedance spectroscopy. The performed results were represented using Nyquist plot, then data analysis was derived using Mathematical equation 2 below.

$$Z'_{faradaic,\omega \to 0} = \frac{R_{ion}}{3} + R_{ct} \quad \text{[Mathematical equation 2]}$$

In Mathematical equation 2, $Z'_{faradaic,\omega \to 0}$ is a total resistance value, $R_{ion}$ is a pore resistance value, and $R_{ct}$ is a charge transfer resistance value.

The pore resistances ($R^f_{ion}$) after formation were measured in the same manner as the pore resistances ($R^0_{ion}$) before formation by forming the electrode cells of Examples 1 to 7 and Comparative Examples 1 to 7, followed fully discharging three times at 2.5 V and 0.3 C-rate, and then the cells were disassembled and the fully discharged electrodes were treated with dimethyl carbonate (DMC) to remove residual electrolyte and lithium ions in the electrode.

2) Measurement of Density

Thicknesses of the anodes of Examples 1 to 7 and Comparative Examples 1 to 7 prepared above were measured at 4 points, and a weight of the anode active material layer was divided by an average thickness of the thicknesses obtained above to calculate densities ($D^0_{vd}$) before formation.

Densities ($D^f_{vd}$) after formation were measured by forming the electrode cells of Examples 1 to 7 and Comparative Examples 1 to 7, followed by fully discharging three times at 2.5 V and 0.3 C-rate, and then the cells were disassembled and the fully discharged electrodes were treated with dimethyl carbonate (DMC) to remove residual electrolyte and lithium ions in the electrode.

3) Measurement Result

Results of the pore resistances ($R^0_{ion}$) and densities ($D^0_{vd}$) before formation are shown in Table 2 below.

TABLE 2

| | Pore resistance ($r^0_{ion}$, ω) | Density ($d^0_{vd}$, g/cc) | $R^0_{ion}/D^0_{vd}$ |
|---|---|---|---|
| Example 1 | 20.4 | 1.63 | 12.50 |
| Example 2 | 20.4 | 1.62 | 12.59 |
| Example 3 | 21.0 | 1.61 | 13.05 |
| Example 4 | 14.1 | 1.59 | 8.87 |
| Example 5 | 18.6 | 1.58 | 11.77 |
| Example 6 | 8.3 | 1.67 | 4.97 |
| Example 7 | 21.0 | 1.50 | 14.00 |
| Comparative Example 1 | 24.3 | 1.58 | 15.38 |
| Comparative Example 2 | 23.1 | 1.56 | 14.80 |

TABLE 2-continued

|  | Pore resistance ($r^o_{ion}$, ω) | Density ($d^o_{vd}$, g/cc) | $R^o_{ion}/D^o_{vd}$ |
|---|---|---|---|
| Comparative Example 3 | 30.0 | 1.60 | 18.75 |
| Comparative Example 4 | 23.1 | 1.55 | 14.89 |
| Comparative Example 5 | 24.0 | 1.57 | 15.28 |
| Comparative Example 6 | 27.0 | 1.63 | 16.54 |
| Comparative Example 7 | 8.0 | 1.80 | 4.44 |

Results of pore resistances ($R^f_{ion}$) and densities ($D^f_{vd}$) after formation are shown in Table 3 below.

TABLE 3

|  | Pore resistance after formation ($r^f_{ion}$, ω) | Density after formation ($d^f_{vd}$, g/cc) | $R^f_{ion}/D^f_{vd}$ |
|---|---|---|---|
| Example 1 | 25.46 | 1.42 | 17.93 |
| Example 2 | 25.10 | 1.41 | 17.80 |
| Example 3 | 26.42 | 1.40 | 18.87 |
| Example 4 | 17.62 | 1.43 | 12.34 |
| Example 5 | 23.21 | 1.44 | 16.14 |
| Example 6 | 12.15 | 1.52 | 7.99 |
| Example 7 | 26.12 | 1.36 | 19.21 |
| Comparative Example 1 | 30.48 | 1.38 | 22.09 |
| Comparative Example 2 | 29.50 | 1.35 | 21.85 |
| Comparative Example 3 | 38.40 | 1.38 | 27.83 |
| Comparative Example 4 | 28.88 | 1.35 | 21.39 |
| Comparative Example 5 | 30.10 | 1.45 | 20.76 |
| Comparative Example 6 | 33.50 | 1.42 | 23.59 |
| Comparative Example 7 | 11.52 | 1.51 | 7.63 |

(3) Evaluation of Capacity Retention Rate

Discharge capacities for each cycle were measured while repeatedly charging and discharging the secondary batteries according to the above-described examples and comparative examples under a high rate condition of 2.0 C (total 30 cycles). Thereafter, the discharge capacity measured at 30 cycles was determined as a ratio (%) compared to the discharge capacity at one cycle.

Evaluation results are shown in Table 4 below.

TABLE 4

|  | Capacity retention rate (%) (2.0 C., 30 cycle) |
|---|---|
| Example 1 | 89.2 |
| Example 2 | 90.3 |
| Example 3 | 86.9 |
| Example 4 | 93.4 |
| Example 5 | 91.0 |
| Example 6 | 96.0 |
| Example 7 | 82.1 |
| Comparative Example 1 | 78.7 |
| Comparative Example 2 | 79.3 |
| Comparative Example 3 | 72.3 |
| Comparative Example 4 | 78.1 |
| Comparative Example 5 | 76.9 |
| Comparative Example 6 | 76.2 |
| Comparative Example 7 | 79.5 |

Referring to Table 4, in the case of the examples having $R^f_{ion}/D^f_{vd}$ value in the range of Equation 1 described above, improved capacity retention rates were secured compared to the comparative examples.

Meanwhile, in the case of Examples 1 and 2, even when the anode is manufactured by using the same loading amount of the anode active material, binder and conductive material, a difference in the pore resistance value and actual density may occur according to the degree of spring-back that occurs after compression, and thereby, it can be seen that a difference in the capacity retention rate may occur.

DESCRIPTION OF REFERENCE NUMERALS

100: Cathode
105: Cathode current collector
110: Cathode active material layer
120: Separation membrane
130: Anode
135: Anode current collector
140: Anode active material layer
150: Electrode assembly
160: Case

What is claimed is:

1. An anode for a lithium secondary battery comprising:
    an anode current collector; and
    an anode active material layer which is formed on at least one surface of the anode current collector and satisfies Equation 1 below:

$$7.99 \leq R^f_{ion}/D^f_{vd} \leq 19.21 \quad \text{[Equation 1]}$$

(In Equation 1, $R^f_{ion}$ and $D^f_{vd}$ are values after formation, wherein $R^f_{ion}$ is a pore resistance (Ω), and $D^f_{vd}$ is a density (g/cc) of the anode active material layer).

2. The anode for a lithium secondary battery according to claim 1, wherein the anode active material layer has a value of pore resistance ($R^f_{ion}$) to density ($D^f_{vd}$) after formation in a range of $12.34 \leq R^f_{ion}/D^f_{vd} 17.93$ in Equation 1 above.

3. The anode for a lithium secondary battery according to claim 1, wherein $R^f_{ion}$ is 12.15 to 26.42Ω.

4. The anode for a lithium secondary battery according to claim 1, wherein $D^f_{vd}$ is 1.36 to 1.52 g/cc.

5. The anode for a lithium secondary battery according to claim 1, wherein a loading amount per unit area of the anode current collector of the anode active material layer is 7.0 to 13.0 mg/cm².

6. The anode for a lithium secondary battery according to claim 1, wherein the anode active material layer includes artificial graphite as an anode active material.

7. The anode for a lithium secondary battery according to claim 6, wherein the artificial graphite is included in an amount of 70% or more based on a total weight of the anode active material.

8. The anode for a lithium secondary battery according to claim 6, wherein the anode active material includes first artificial graphite in a form of secondary particles and second artificial graphite in a form of single particles.

9. The anode for a lithium secondary battery according to claim 8, wherein the first artificial graphite is included in an amount of 30 to 70% by weight and the second artificial graphite is included in an amount of 30 to 70% by weight based on the total weight of the anode active material.

10. The anode for a lithium secondary battery according to claim 8, wherein the first artificial graphite includes core particles and an amorphous coating formed on the core particles.

11. The anode for a lithium secondary battery according to claim 8, wherein the second artificial graphite includes core particles and an amorphous coating formed on the core particles.

12. The anode for a lithium secondary battery according to claim 8, wherein the first artificial graphite particles have an average particle diameter larger than an average particle diameter of the second artificial graphite particles.

13. A lithium secondary battery comprising:
the anode for a lithium secondary battery according to claim 1; and
a cathode which is disposed to face the anode with being physically separated therefrom.

* * * * *